(No Model.)
C. M. BLYDENBURGH.
VEHICLE.
No. 394,329. Patented Dec. 11, 1888.
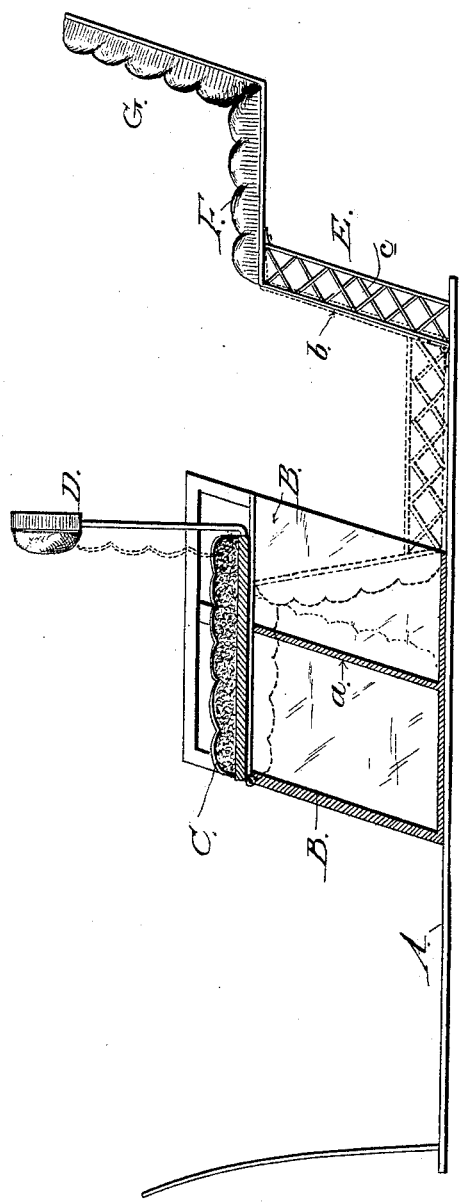
WITNESSES.
T. W. Fowler
W. H. Patterson
INVENTOR.
Chas M. Blydenburgh,
by A. H. Evans & Co
his Attorneys.

UNITED STATES PATENT OFFICE.

CHARLES M. BLYDENBURGH, OF RIVERHEAD, NEW YORK.

VEHICLE.

SPECIFICATION forming part of Letters Patent No. 394,329, dated December 11, 1888.

Application filed October 12, 1888. Serial No. 287,904. (No model.)

*To all whom it may concern:*

Be it known that I, CHARLES M. BLYDENBURGH, a citizen of the United States, residing at Riverhead, Long Island, State of New York, have invented certain new and useful Improvements in Vehicles, of which the following is a full and clear description, reference being had to the accompanying drawing, forming part of this specification, in which the figure represents a longitudinal sectional view of a vehicle-body and front and rear seats.

My invention relates principally to the construction of the seats of vehicles employing folding rear seats; and the same consists in the constructions and combinations of devices, which I shall hereinafter fully describe and claim.

To enables others skilled in the art to which my invention appertains to make and use the same, I will now describe its construction and indicate the manner in which it is carried out.

In the said drawing, A represents the bottom of the vehicle; B, the box or body portion, and C the front seat, which is hinged to the front portion of the box or body A, whereby it may be turned forward to expose the internal chamber with which the body is preferably formed.

The seat C may be formed with or without the lazy-back D, and the body B is open at the rear, and may be provided with a partition, $a$, set some distance forward of the rear, as shown, and for a purpose I will hereinafter indicate.

Near the rear end of the bottom A, I hinge or pivot a rear seat-standard, E, which may consist of the rod $b$, or, if preferred, the light frame, $c$, which is composed of some open work of appropriate design, and which, when let down, as shown by dotted lines, occupies the space upon each side of the vehicle, between the back of the box or body and the hinge or pivot of the standard of the rear seat-support. By thus constructing and hinging the rear seat-standard it is obvious said standard when lowered, as shown by dotted lines, constitutes side rails, which greatly add to the general appearance of the vehicle and retain such packages as may be placed between them.

In many "buckboards" and similar vehicles a rear seat is used, and it is adapted to fold within the body portion of said vehicle; but in most cases the occupant of the rear seat must ride backward, owing to the want of room and the construction of the vehicle. In the present case I also employ a rear seat, but I so arrange the parts that the occupant of the rear seat, when the latter is in use, is permitted to ride with his face toward the front, thereby obviating the disagreeable features of the ordinary rear seat. To bring about this desirable result, I secure to the top of the seat-standard E, previously described, the rear seat, F, and form this seat with or without a lazy-back, G, the said seat and lazy-back being upholstered or not as the circumstances require.

From this description it will be seen that when not in use the rear seat is folded forward, so that it forms the rear part of the box or body, and its seat-standard forms the side rails of the bottom, which, when removed by throwing the rear seat into position, admits of easy access to the rear seat, the necessity of stepping over the railing being removed. When so folded, the rear seat portion and lazy-back enter the open rear end of the box or body A, the lazy-back, provided a hinged one is used, resting against the internal partition, $a$, of said box or body, as shown by dotted lines. If the lazy-back is rigid with the rear seat portion, then it will be necessary to raise the front seat, so as to permit the introduction beneath said seat of the lazy-back, which, when in place, is immediately under the front seat, and may serve as a support therefor. I am thus enabled to provide a vehicle with front and rear seats, and utilize the rear seat as a means of ornament to the vehicle when said seat is not in actual use, and also make the rear seat as accessible as the front seat.

Having thus described my invention, what I claim as new, and desire to secure by Letters Patent, is—

1. The combination, with a vehicle-body and a front seat, of a rear seat having a standard which forms a railing for the bottom or floor of the vehicle when said seat is folded forward and not in use, substantially as herein described.

2. A vehicle having a rear seat, the standard or support of which, when folded down, forms a railing along the sides of the bottom or floor of the vehicle, substantially as herein described.

3. The combination, with the box or body having an open rear end, a seat hinged to the front of said body, a rear seat-standard hinged or pivoted to the bottom or floor of the vehicle back of the box or body portion, and a rear seat supported upon said standard and adapted to enter the open rear end of the box or body, substantially as herein described.

4. The combination, with the box or body having an open rear end and an internal partition, a seat hinged to said box or body, a hinged rear seat-standard adapted to fold forward, a rear seat supported on said standard, and a lazy-back secured to said rear seat and adapted with said seat to fold forward into the rear open end of the box or body, substantially as herein described.

CHARLES M. BLYDENBURGH.

Witnesses:
W. H. PATTERSON,
T. WALTER FOWLER.